F. W. YOUNG.
AIR DEFLECTOR FOR DYNAMO ELECTRIC MACHINES.
APPLICATION FILED DEC. 6, 1907.

919,279.

Patented Apr. 20, 1909.

Witnesses:
Samuel W. Balch
Frank C. Cole

Inventor,
Frederick William Young,
by Thomas Ewing, Jr.,
Attorney.

UNITED STATES PATENT OFFICE.

FREDERICK WM. YOUNG, OF EAST ORANGE, NEW JERSEY, ASSIGNOR TO CROCKER-WHEELER COMPANY, OF AMPERE, NEW JERSEY, A CORPORATION OF NEW JERSEY.

AIR-DEFLECTOR FOR DYNAMO-ELECTRIC MACHINES.

No. 919,279.   Specification of Letters Patent.   Patented April 20, 1909.

Application filed December 6, 1907. Serial No. 405,326.

*To all whom it may concern:*

Be it known that I, FREDERICK WILLIAM YOUNG, a citizen of the United States of America, and a resident of East Orange, Essex county, State of New Jersey, have invented certain new and useful Improvements in Air-Deflectors for Dynamo-Electric Machines, of which the following is a specification.

In dynamo-electric machines, particularly of the general mechanical structure typified in large alternating current generators, having rotors with radially disposed poles, air currents are centrifugally induced in the spaces or passageways between the coils on the rotor poles, and these currents have been found to be adequate, if properly directed, for cooling the stator core and windings against which the currents are thrown. But, unless special means are provided, it has been found that such currents take a more or less transverse direction in each passageway, which is the same in all the passageways, with the result that all the air currents flow, soon after the generator is started, over the stator windings in the same way at one side or the other of the generator and continue to flow at the same side as long as the generator is kept continuously running. Perfect symmetry of design does not prevent this phenomenon. In consequence, the stator windings at one side remain in comparatively dead air and are not properly cooled. The side to which all of the air currents become directed appears to be often a matter of chance unless there is air blowing against one side of the machine at the time of starting.

The object of the invention is to provide means for securing an equal distribution of such air currents on each side of the machine and over the stator core and coils.

A further object of the invention is to secure such distribution without increasing the air resistance of the machine.

Figure 1:
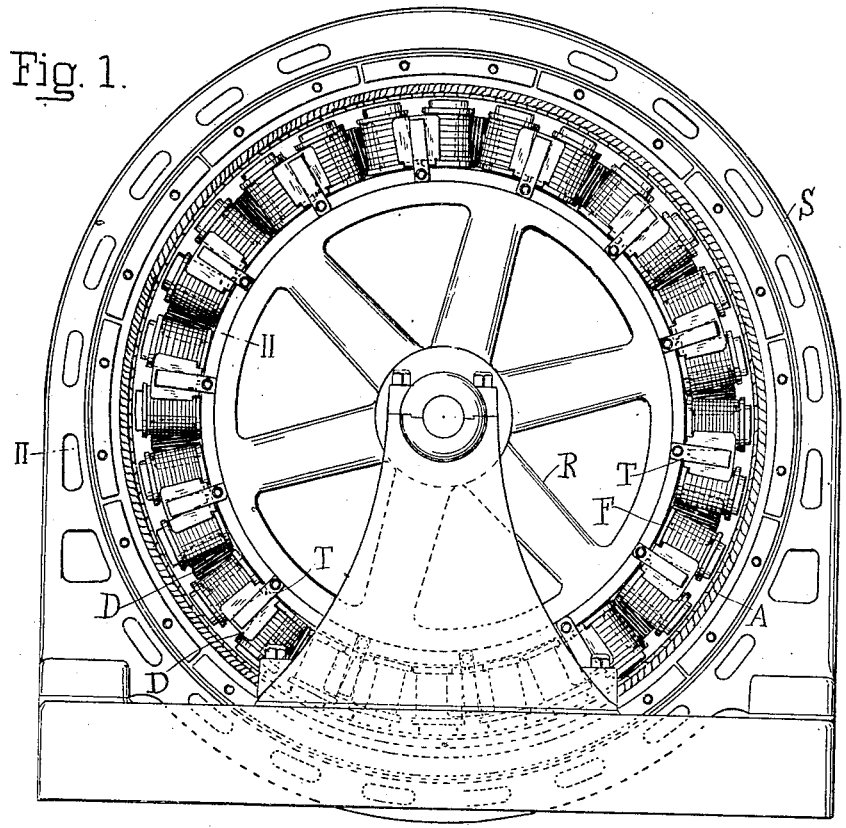
Figure 2:
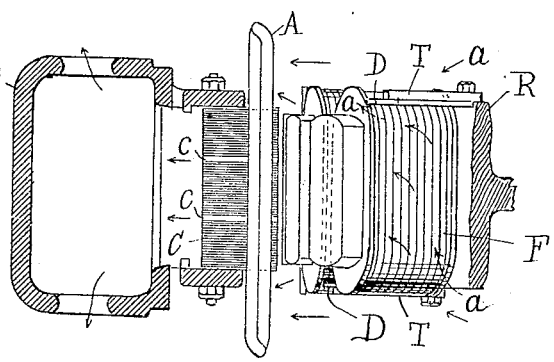

In the accompanying sheet of drawings, which forms a part of this application,—Figure 1 is an elevation of an alternating current generator provided with air-deflectors in accordance with my invention. Fig. 2 is a section through a portion of the rotor and stator on the line II—II of Fig. 1 drawn to a larger scale, the section through the rotor being taken above the center so as to show several of the rotor poles.

The drawings illustrate an alternating current generator consisting of a stator frame S provided with stator windings A A on a laminated annular core C, and a rotor frame R provided with rotor windings F F on radially disposed poles P P spaced around the rotor frame and projecting away from the center. The laminated core has ventilating spaces $c$ $c$. The rotor windings are spaced more or less from each other, leaving transverse air passageways adjoining the stator and with one side of each more or less closed by the face of the stator core and the stator windings. These passageways are blocked by deflectors D D preferably placed at one end of each passageway, half of the deflectors being located near or at the ends at one side and half being located at or near the ends at the other side of the rotor and preferably alternating in their location. These deflectors may be of metal or other suitable material, or as shown, the blades of the deflectors may be of fiber, riveted to supporting bars T T of iron or composition by which they are secured to the rotor frame.

When the generator is running the centrifugal action on the air in each passageway induces a flow radially outward against the face of the stator and through the vents in the stator core. These vents are insufficient to conduct all of the air impelled outward, and the transverse spaces, being more or less blocked by the deflectors, the remainder of the air thus set in motion by centrifugal action is divided between the two sides of the machine. The directions of the flow of the air as described above are indicated by arrows $a$ $a$.

What I claim as new and desire to secure by Letters Patent of the United States is—

1. In a dynamo-electric machine the combination with a rotor having radially disposed poles and windings thereon, of deflectors near one end of each of the passageways between the rotor windings which block the passageways, substantially as described.

2. In a dynamo-electric machine the combination with a rotor having radially disposed poles and windings thereon, of deflectors near one end of each of the passageways between the rotor windings and which block the passageways without blocking the entrance at the opposite end of each of the passageways, substantially as described.

3. In a dynamo-electric machine the combination with a rotor having radially disposed poles and windings thereon, of a deflector individual to one end of each of the passageways between the rotor windings, substantially as described.

4. In a dynamo-electric machine the combination with a rotor having radially disposed poles and windings thereon, of deflectors which interrupt the passageways between the rotor windings, the deflectors for part of the passageways being near the ends of the passageways at one side of the machine and the deflectors in other of the passageways being near the ends of the passageways at the other side of the machine, substantially as described.

Signed by me at East Orange, N. J., this 19th day of September, 1907.

FREDERICK WM. YOUNG.

Witnesses:
EDWARD HEITMANN,
ANTHONY J. PORSKRÉVIES.